United States Patent [19]

Tanabe

[11] Patent Number: 4,788,542

[45] Date of Patent: Nov. 29, 1988

[54] REMOTE CONTROL DEVICE FOR VEHICLE LOCKS

[75] Inventor: Ritsushi Tanabe, Shiki, Japan

[73] Assignee: Yuhshin Co., Ltd., Tokyo, Japan

[21] Appl. No.: 932,350

[22] Filed: Nov. 19, 1986

[30] Foreign Application Priority Data

Apr. 23, 1986 [JP] Japan ................................ 61-92328
May 9, 1986 [JP] Japan ................................ 61-104719

[51] Int. Cl.⁴ ................................ H04Q 1/00

[52] U.S. Cl. ................................ 340/825.31; 340/825.69; 455/603; 307/10 AT; 365/100

[58] Field of Search ................................ 340/825.31, 825.57, 340/825.58, 825.62, 825.63, 825.69, 825.72, 63, 365 S; 375/21-24; 455/603, 608, 613; 365/168, 94, 187, 100, 148, 46; 307/463, 10 AT

[56] References Cited

U.S. PATENT DOCUMENTS

| | | | |
|---|---|---|---|
| 3,350,691 | 10/1967 | Faulis et al. | 365/94 |
| 4,143,368 | 3/1979 | Route et al. | 455/603 |
| 4,189,713 | 2/1980 | Duffy | 340/825.63 |
| 4,241,456 | 12/1980 | Nakagaki et al. | 455/603 |
| 4,258,352 | 3/1981 | Lipschutz . | |
| 4,426,662 | 1/1984 | Skerlos et al. | 455/603 |
| 4,482,947 | 11/1984 | Zato et al. | 455/603 |
| 4,555,702 | 11/1985 | Matsurra et al. | 340/825.64 |
| 4,583,189 | 4/1986 | Koyama | 340/365 S |
| 4,583,201 | 4/1986 | Bertin et al. | 365/100 |
| 4,602,255 | 7/1986 | Kitagawa et al. | 340/825.72 |
| 4,670,746 | 6/1987 | Taniguchi et al. | 340/825.31 |

OTHER PUBLICATIONS

Gahran et al., "Ternary Read-Only Memory", IBM Technical Disclosure Bulletin, vol. 4, No. 5, Oct. 1961.

*Primary Examiner*—John W. Caldwell, Sr.
*Assistant Examiner*—Edwin C. Holloway, III
*Attorney, Agent, or Firm*—Finnegan, Henderson, Farabow, Garrett & Dunner

[57] ABSTRACT

A remote control device for operating vehicle locks having a transmitter for transmitting a remote control signal. The transmitter converts keyword information into pulses of corresponding pulse widths and then pulse modulates these converted pulses prior to transmission as a remote control signal. A receiver is provided for demodulating and decoding the signal and comparing it to a preset code. If the signal corresponds to the preset code an execution signal is generated to produce the locking and locking function.

3 Claims, 6 Drawing Sheets

REMOTE CONTROL DEVICE FOR VEHICLE LOCKS

BACKGROUND OF THE INVENTION

The present invention relates to a remote control device adapted to control locking and unlocking, remotely from a vehicle such as an automobile vehicle, locks for doors and trunk of such vehicle.

Locks for doors and trunk of the automobile vehicle are often locked and unlocked by manually operating a key inserted thereinto. Recently, a remote control device has been developed which utilizes an electrical or optical remote control signal instead of the key to lock and unlock remotely from the automobile vehicle. Such remote control device comprises a receiver equipped on the automobile vehicle and a portable transmitter provided independently of the automobile vehicle.

A particular keyword information (key number) is assigned to each automobile vehicle in the form of a corresponding encoded information and a remote control signal in accordance with this encoded information is transmitted by a trigger operation from said transmitter. More specifically, the encoded information is directly modulated by the pulse number modulation technique to a corresponding pulse number of minimum width and the train of pulses thus obtained is electrically or optically transmitted as the remote control signal. As the optical remote control signal, infrared-ray energy has usually been used.

The receiver receives the remote control signal, demodulates or decodes it to regenerate the encoded information, compares this encoded information with an information previously stored by the lock and outputs an execution signal only when a result of this comparison is positive.

The door locks or the trunk lock are controlled by this execution so that the locked lock is unlocked and the unlocked lock is locked again. To prevent repeated locking and unlocking occurring due to repeated transmission of the remote control signal, there has been provided a countermeasure such that the one-way control from "locking" to "unlocking" or from "unlocking" to "locking" should be performed when said repeated transmission of the remote control signal is made within a predetermined time period.

The lock controlled in such a manner includes an electromagnetic driving mechanism adpated to be activated with said execution signal. Although the lock control is effected simultaneously with respect to all the door locks, different reception areas are assigned to respective remote control means associated with the door locks and with the trunk lock so that the door locks and the trunk lock may be separately controlled.

As indicated above, the remote control device of prior art utilizes a train of pulses having minimum width converted from the keyword information as the remote control signal and, as a result, is susceptive of malfunction due to influence of an electrical noise.

FIG. 5 illustrates by way of example a train of pulses transmitted as the remote control signal, in which each pulse width is 0.1 millisecond, synchronizing pulses P appear at an interval of 2.5 milliseconds, and the synchronizing pulses P having no signal pulse therebetween represent a code "0" while the synchronizing pulses P having a signal pulse P1 therebetween represent a code "1". Such remote control signal is code-regenerated on the basis of a count of the pulse number and, therefore, when an electrical noise pulse PX is generated as indicated by broken lines, the code "0" would be regenerated as the code "1", causing a malfunction.

The electrical noise is caused not only by operation of the device but also by the environmental factors and it has been difficult to overcome this perfectly.

Furthermore, in view of a fact that, with such remote control device, the transmitter is operated remotely from the automobile vehicle, the user often places reliance on function of the device and fails to confirm a result. A possible malfunction of the device would result in leaving the automobile vehicle with its doors and trunk unlocked and, with consequence, theft of goods loaded on the automobile vehicle or even of the automobile vehicle itself.

SUMMARY OF THE INVENTION

The present invention has been developed in view of the above-mentioned problems and is characterized in that the transmitter provided independently of the vehicle converts a particular keyword information into pulses of corresponding pulse widths and then pulse-modulates these converted pulses prior to transmission while the receiver equipped on the vehicle receives said pulse-modulated signal as the remote control signal and demodulates this to produce a predetermined output.

Said remote control signal comprises a train of pulse groups each including a plurality of pulses generated in accordance with each pulse width of the converted pulses, so that the electrical noise signals possibly generated among the pulse groups are prevented from being regenerated as the code information and substantially no malfunction due to such noise signal may occur.

DESCRIPTION OF THE PREFERRED EMBODIMENTS

The invention will be clearly understood on reading of the following description of preferred embodiments given in reference with the accompanying drawing.

Referring to FIG. 1 which illustrates, in a block diagram, an electronic circuit arrangement of a transmitter adapted to be portably used independently of an automobile vehicle, reference numeral 11 designates an information generator, 12 an information processor, 13 a trigger switch and 14 a driver.

Said information generator 11 is used for previous generation of particular keyword number codes for the respective autombile vehicles and the information generation is performed, for example, by coding in binary form such as '1, 0, 0, 1, 1, 0, 0,'. As an example of such coding the respective input terminals for coding purpose of microcomputer may be connected to a power supply line or a ground line to achieve the desired coding.

The information processor 12 is adapted to convert the keyword number codes into pulses having pulse widths predetermined for the respective codes and to subject the pulses thus converted to pulse modulation.

During conversion from the keyboard number codes to the pulses having the corresponding widths performed by this information processor 12, the code "1" appears as a pulse P 10 having a larger width and the code "0" appears as a smaller width at a predetermined timing, as seen in FIG. 3(*a*).

These converted pulses are modulated by a carrier as illustrated by FIG. 3(*b*) to provide a pulse-modulated output signal as illustrated by FIG. 3(*c*). This output signal comprises a train of carrier pulse groups generated in correspondence to the pulse widths of the respective converted pulses.

The conversion from the codes into the pulses and the pulse modulation thereof can be achieved by previously programming the microcomputer so that the keyboard number codes may be input to this microcomputer to produce the modulated pulses as the output thereof. The pulse modulation may be performed by the circuit arrangement well known as a transmission system for the pulse modulation.

The driver 14 may be a well known high velocity pulse driver adapted to drive an infrared light emitting diode 15 which emits light as infrared-ray energy.

The transmitter includes a power source such as alkaline batteries which, upon closure of the trigger switch 13, respective circuit sections. Once energized, the codes generated from the information generator 11 are converted into the corresponding pulse widths and are pulse-modulated. Then the driver 14 responds to the modulated signal to drive the infrared light emitting diode 15. The infrared light emitting diode 15 emits, in accordance with the modulated signal as illustrated by FIG. 3(*c*), the infrared-ray energy which is transmitted as a remote control signal, to a receiver as will be described later.

BRIEF DESCRIPTION OF THE DRAWINGS

FIGS. 1 and 2 schematically illustrate an embodiment of the present invention, in which FIG. 1 is a block diagram illustrating an electronic circuit of a transmitter and FIG. 2 is a block diagram illustrating an electronic circuit of a receiver;

Referring to FIG. 2 which illustrates in a block diagram an electronic circuitry of a receiver with which an automobile vehicle is equipped, reference numeral 17 designates a photodiode adapted to sense the infrared-ray energy having passed through a filter 18 which may be of prior art construction, e.g., an infrared-ray filter or an absorption filter. The receiver further includes an amplifier 19, a demodulator 20 and waveform shaper 21. The amplifier 19, demodulator 20 and waveform shaper 21 may be integrally formed as a preamplifier 22 for light receiving and the demodulator 20 may be the circuit arrangement well known for a transmission system for pulse modulation. Reference numeral 23 designates an information processor, 24 a collating code generator, 25 a driver, and 26 a lock driving mechanism.

Figure 1:
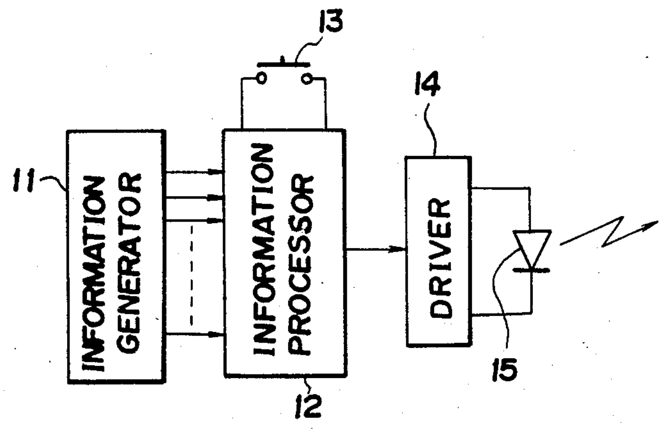
Figure 2:
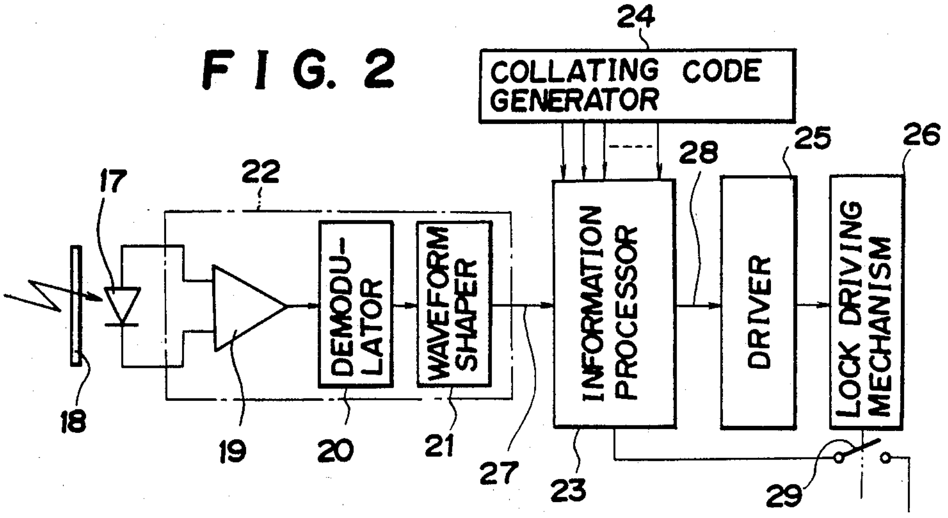
Figure 3:
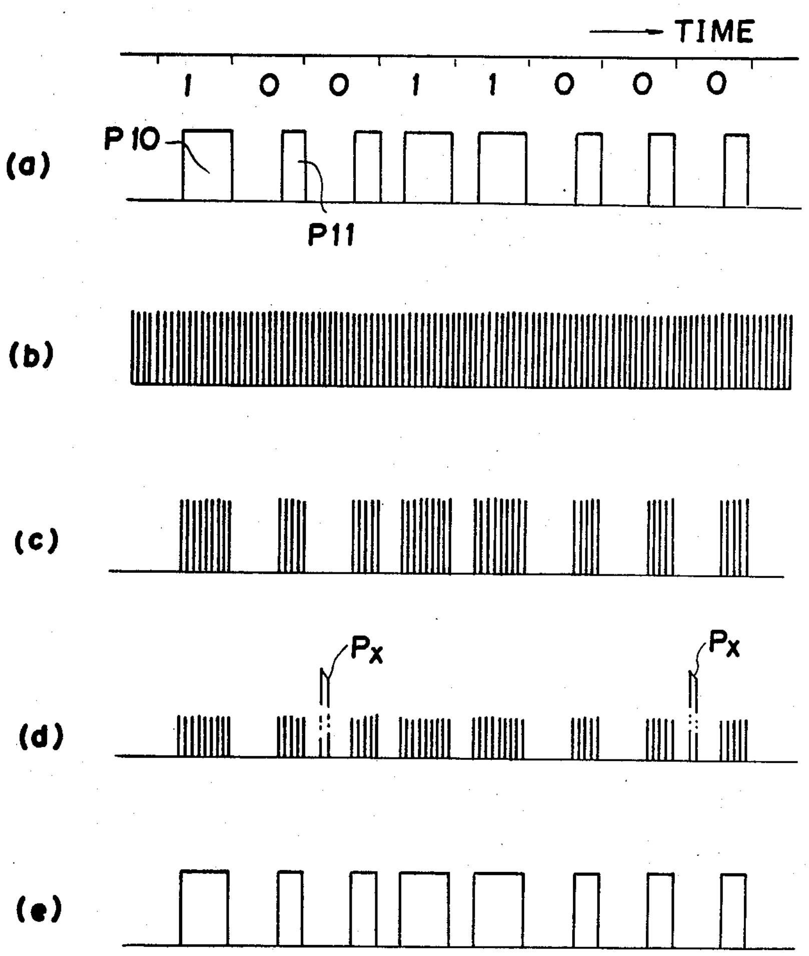
FIGS. 3(*a*), (*b*) and (*c*) respectively illustrate code-converted pulses, carrier and modulated pulses generated by the transmitter and FIGS. 3(*d*) and (*e*) respectively illustrate photoelectrically converted pulses and demodulated pulses generated by said receiver.

The output signal from said photodiode 17 is in the form of the pulse-modulated photoelectric conversion output signal as illustrated by FIG. 3(*d*), which is, in turn, input to the preamplifier 22 for light receiving. This preamplifier 22 for light receiving amplifies, demodulates and waveform shapes said photoelectric conversion signal to provide a pulse signal 27 as illustrated by FIG. 3(*e*) which is same, in its waveform, as the code-converted pulse.

Said information processor 23 is applied with the output signal 27 and decodes this signal 27 to regenerate the original binary code such as '1, 0, 0, 1, 1, 0, 0'.

This information processor 23 includes a comparator adapted to compare said regenerated code with the collating code and outputs an execution signal 28 upon coincidence of these two code systems. Said comparator may be constructed so that the number of pulses associated with the collating code is compared to the number of pulses associated with the regenerated code or the modulated pulses as illustrated by FIG. 3(*e*) are integrated and such integrated voltage is compared to a reference voltage associated with the collating code.

The information processor 23 comparing the regenerated code with the collating code as mentioned above may be a comparator well known in the art or a microcomputer which has previously been programmed.

The collating code has previously been prepared by the collating code generator 24 which is identical in its construction to the information generator 11 included in the transmitter.

The driver 25 is activated with the execution signal 28 to control the lock driving mechanism 26 so that locking or unlocking may be performed. The driver 25 and the lock driving mechanism 26 may be those well known in the art. Reference numeral 29 designates a switch operatively associated with locking and unlocking. This switch 29 applies a signal "0" upon closure thereof and a signal "1" upon opening, respectively, to the information processor 23 which, in turn, determines a locked condition or an unlocked condition on the basis of these input signals and outputs an execution signal required for transition from "locking" to "unlocking" or from "unlocking" to "locking".

The receiver comprising the above-mentioned circuit components receives the infrared-ray energy in accordance with the pulse modulation and demodulates and decode this. Therefore, even when any noise pulse PX as illustrated by FIG. 3(*d*) is inserted between each pair of adjacent modulated pulses, such pulse PX is removed in the course of demodulation (during which those of a frequency same as that of the carrier are demodulated) and even when the noise pulse is mixed into the modulated pulse itself, a possible effect of the noise pulse can be minimized by integrating the demodulated pulses (FIG. 3(*e*)) before comparison.

Figure 4:
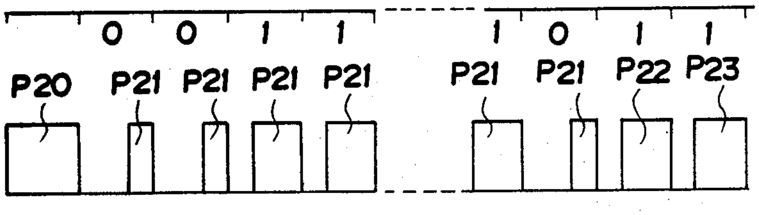
FIG. 4 illustrates information contents of a remote control signal transmitted from the transmitter.
Figure 5:
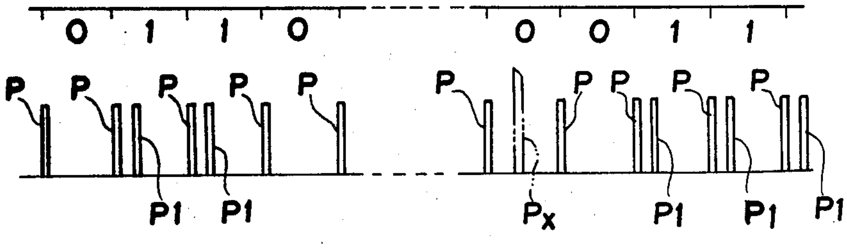
FIG. 5 PRIOR ART
FIG. 5 illustrates a remote control signal usually used by the device of prior art.

The remote control signal transmitted from the transmitter contains many information contents and specifically forms a pulse frame as illustrated by FIG. 4. The pulse frame illustrated by way of example of FIG. 4 comprises 17 bits and each code-converted pulse has any one of three pulse widths, i.e., 3 milliseconds, 2 milliseconds or 1 millisecond. These pulses are pulse modulated by the carrier of 40 KHz. A pulse P20 serves as a start signal, a pulse P21 of 16 bits serves as a keyword number code, a pulse P2² serves as a signal identifying a door lock and a trunk lock, and a pulse P23 serves as an end signal. The transmitter which transmits such remote control signal is conveniently provided with a code input device as illustrated by FIG. 6 as the information generator 11.

Figure 6:
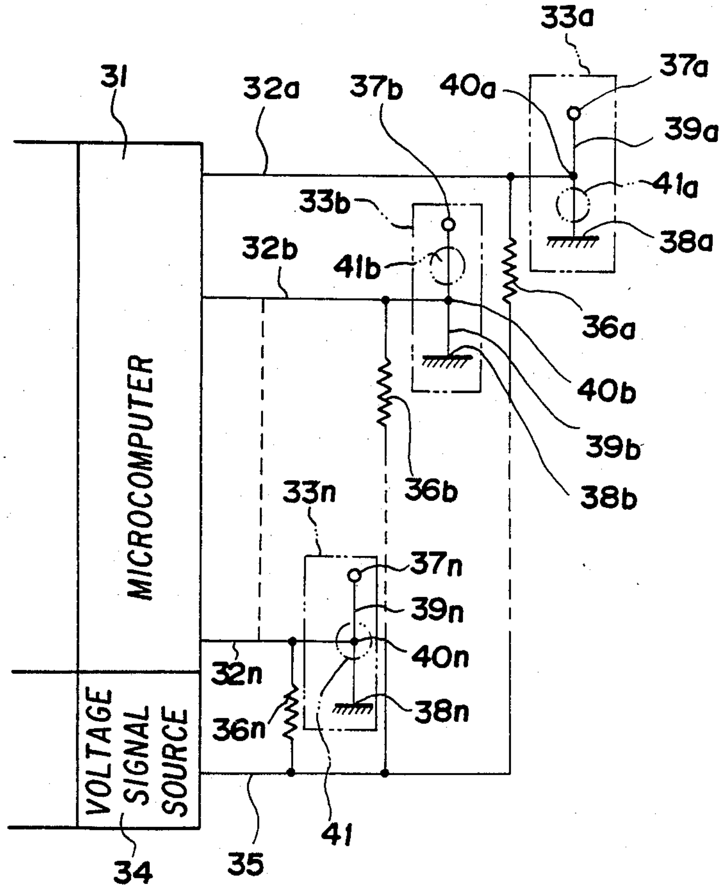
FIG. 6 is a circuit diagram of a code input device.

Referring to FIG. 6, reference numeral 31 designates a microcomputer serving as the information processor 12, reference numerals 32*a* through 32*n* designate code input terminals, 33*a* through 33*n* code generating elements, 34 a voltage signal source, 35 a voltage signal output terminal and 36*a* through 36*n* resistor members.

To said code input terminals 32*a* through 32*n*, there are connected the associated code generating elements 33*a* through 33*n* which are formed as by means for the formation of a printed circuit in identical conductive patterns. For example, the code generating element 33*a* ehxibits a conductive pattern 39*a* having one terminal 37*a* connected to a voltage source of a predetermined voltage, another terminal 38*a* connected to a ground voltage source and a middle point 40*a* connected to the code input terminal 32*a*. It should be understood that reference symbols 37*b* through 40*b* of the code generating element 33*b* as well as reference symbols 37*n* through 40*n* of the code generating element 33*n* designate the corresponding points.

Figure 7:
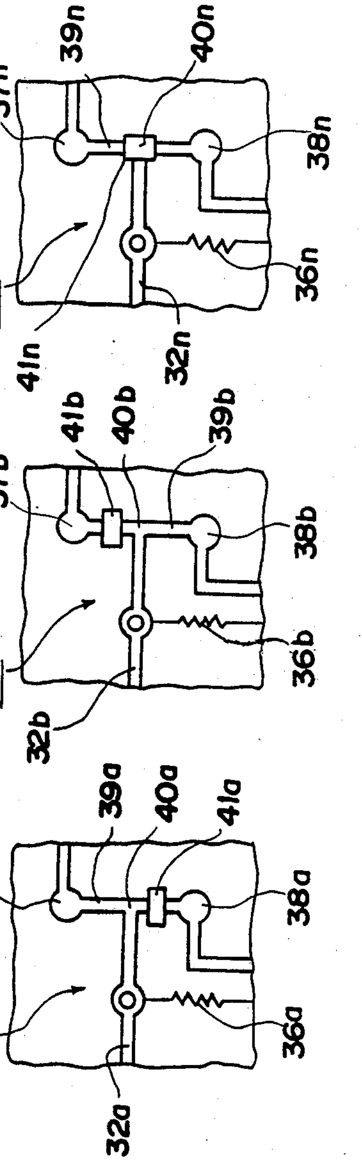
FIGS. 7(*a*), (*b*) and (*c*) are fragmented schematic illustrations by way of example in enlarged scale of code generating elements for coding.

Each of the code generating elements 33*a* through 33*n* performs encoding of the input information in the manner illustrated by FIGS. 7(*a*), (*b*) and (*c*). More specifically, there is provided between the terminal 38*a* and the middle point 40*a* a punched out portion 41*a*, as illustrated in FIG. 7(*a*), to effect encoding "1"; there is provided between the terminal 37*b* and the middle point 40*b* a punched out portion 41*b*, as illustrated by FIG. 7(*b*), to effect encoding "0"; and there is provided a punched out portion 41*n* directly on the middle point 40*n*, as illustrated by FIG. 7(*c*), to effect encoding "open voltage" (high impedance). The encoding "open voltage" can be effected also when there are provided two punched out portions between the terminal 37*n* and the middle point 40*n* and between the terminal 38*n* and the middle point 40*n*, respectively.

The remainder of the code generating elements 33*c* through 33*n*−1 also perform encoding in a similar manner. It should be noted here that FIGS. 7(*a*), (*b*) and (*c*) is only an exemplary illustration and locations of the punched out portions in the respective code generating elements 33*a* through 33*n* depend on the keyword number codes to be input.

Figure 8:
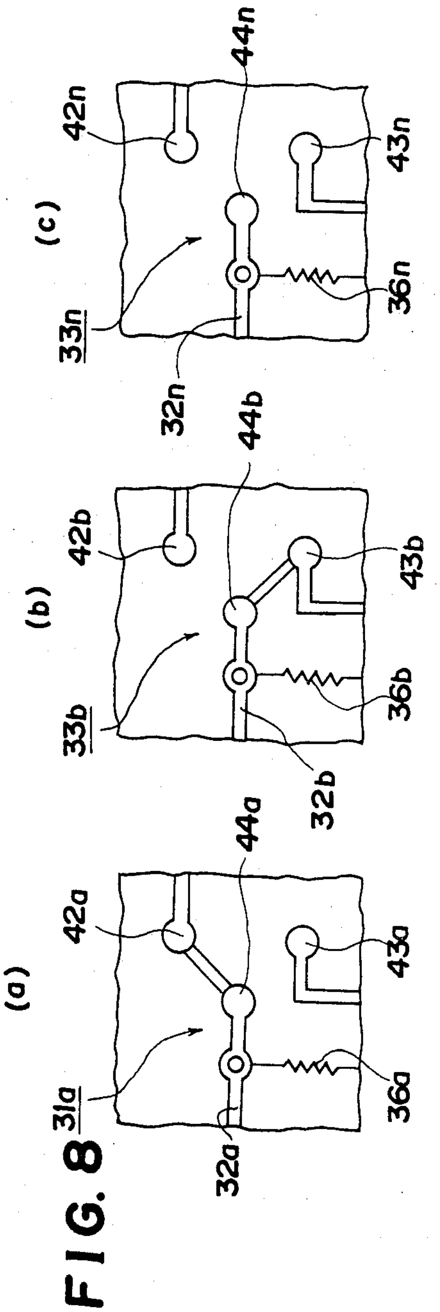
FIGS. 8(*a*), (*b*) and (*c*) are schematic illustrations similar to FIG. 7, of the other embodiments of the code generating elements.

The code generating elements 33*a* through 33*n* may be formed also by combination of first, second and third conductive components slightly spaced from one another, as illustrated by FIG. 8. The code generating element 33*a* illustrated by FIG. 8(*a*) comprises the first conductive component 42*a* connected to a voltage source of a predetermined voltage, the second conductive component 43*a* connected to a ground voltage source and the third conductive component 44*a* connected to the code input terminal 32*a*. This is the same with respect to the remaining code generating elements. Thus, referring to FIGS. 8(*b*) and (*c*), reference numerals 42*b* and 42*n* designate the first conductive components, 43*b* and 43*n* the second conductive components, and 44*b* and 44*n* the third conductive components.

In the present embodiment, encoding "1" is effected when the first conductive component 42*a* is connected to the third conductive component 44*a*, as illustrated by FIG. 8(*a*); encoding "0" is effected when the second conductive component 43*b* is connected to the third conductive component 44*b*, as illustrated by FIG. 8(*b*); and encoding "open voltage" is effected when the respective conductive components 42*n*, 43*n* and 44*n* are not connected together.

The voltage signal source 34 as illustrated by FIG. 6 is incorporated into a part of the microcomputer 31 and produces at its output terminal 35 a voltage signal in response to a code input. This voltage signal varies from a high level voltage "1" to a low level voltage "0" and is applied through the resistor members 36*a* through 36*n* commonly to the respective code input terminals 32*a* through 32*n*. The voltage signal source 34 may be constructed so that the voltage signal varies from the low level voltage "0" to the high level voltage "1" or may be an arrangement provided independently of the microcomputer 31.

Now operation of the code input device will be discussed. When the respective circuit sections are energized in the code input, the code generating element 33*a* produces the voltage of code "1", the code generating element 33*b* produces the voltage of code "0" and the code generating element 33*n* is at the "open voltage".

So long as the voltage signal source 34 is generating the voltage signal "1", the code voltage of the code generating elements 33*a* and 33*b* remain "1" and "0", respectively, and only the code generating element 33*n* is changed over from the "open voltage" to the code voltage "1". The code voltage "1" is input to the code input terminal 32*n* while the state of the code generating element 33*n* remains unchanged.

Upon change-over of the voltage signal of the voltage signal source 34 from "1" to "0", the code voltages of the code generating elements 33*a* and 33*b* remain "1" and "0", respectively, but the code voltage of the code generating element 33*n* is changed over from "1" to "0".

In consequence, during continuous generation of the voltage signal, the code input terminal 32*a* continues to be applied with the code voltage "1, 1", the code input terminal 32*b* continues to be applied with the code voltage "0, 0", and the code input terminal 32*n* continues to be applied with the code voltage "1 and 0".

Figure 9:
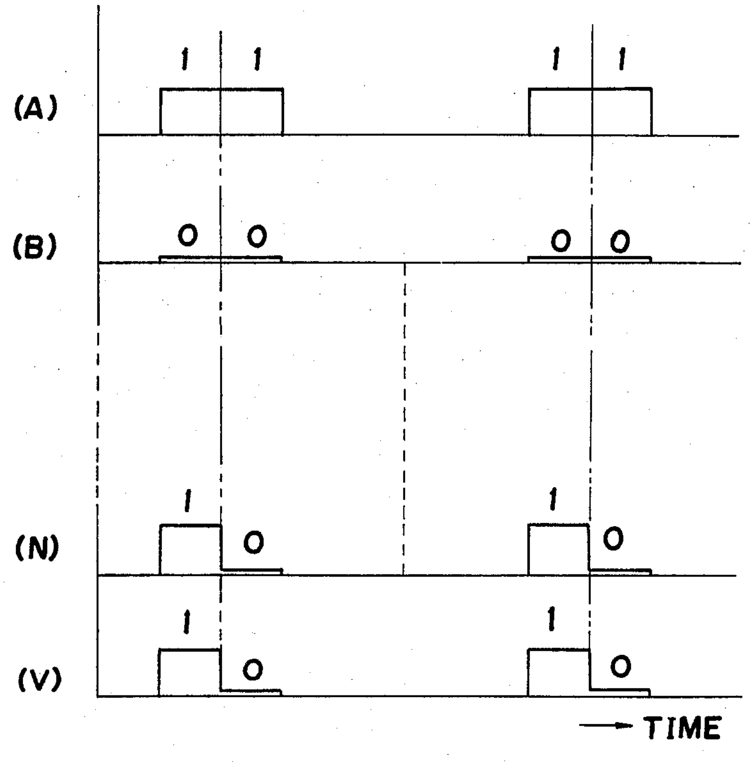
FIG. 9 is a time chart illustrating code voltages input by the code input device.

FIG. 9 is a time chart illustrating the above-mentioned code input with respect to the time elapsing, on the assumption that the code input is repeated twice.

Referring to FIG. 9, reference symbol (A) represents the code voltage "1, 1" input from the code input terminal 32*a*, (B) represents the code voltage "0, 0" input from the code input terminal 32*b*, (N) represents the code voltage "1, 0" input from the code input terminal 32*n*, and (V) represents the voltage signal "1, 0" output from the output terminal 35. As can be seen from this figure, the input device is applied with the codes as binary codes selected from three types "1, 1", "0, 0" and "1; 0", so that the input device can be applied with totally $3^n$ coded input information where n represents the number of input terminals.

When the voltage signal source 34 generates the voltage signal varying from "0" to "1", there are provided the binary codes of three types "1, 1", "0, 0" and "0, 1". Accordingly, if there is provided the output terminal 35 as in the code input device, the number of terminals will be $n+1$ and it will be possible to perform the code input of $3^n$ informations using this number of terminals.

More specifically, with a microcomputer having ten code input terminals, the addition of one output terminal results in totally eleven terminals and it is possible for this microcomputer to perform the code input on $3^{10}=59,049$ informations. With the conventional microcomputer having sixteen code input terminals, the code input will be performed on $2^{16}=65,536$ informations.

As will be understood therefrom, provision of the above-mentioned code input device permits the microcomputer having the same number of code input terminals as the conventional microcomputer to input the number of information S higher than the conventional microcomputer can input or permits a smaller sized microcomputer having fewer code input terminals to achieve the number of informations S substantially as achieved by the conventional microcomputer.

It is also possible to transmit a predetermined quantity of information with fewer transmission bits by preparing the keyword code not in binary but in ternary form and thereby defining a width of the transmitting pulse into three patterns. In such a case, a time period required for transmission can be shortened and a current consumption required for transmission can be reduced.

Although a keyword information is converted into the corresponding pulse width in the embodiment that has been described hereinabove, it is also possible to convert the keyword information into the corresponding location of the pulse having a constant width.

There may be provided means responsive to reception of the remote control signal by the receiver to light a room lamp temporarily or to activate a buzzer temporarily remotely from the automobile vehicle.

Assuming that the locking is effected by the first operation and the unlocking is effected by the next operation of the receiver, an arrangement is convenient such that the door or the trunk is automatically locked again and kept locked in spite of possibly repeated remote control signals from the transmitter unless the door or trunk is opened within a predetermined time period (e.g., five seconds).

It should be understood that the device according to the present invention is identical to the devices of prior art in aspects, for example, in that the above-mentioned receiver controls every door lock of the automobile vehicle and that the one-way control from "locking" to "unlocking" or from "unlocking" to "locking" is effected even when the remote control signal from the transmitter is repeated within a short time period.

The remote control device of the invention may utilize a radio signal instead of the infrared-ray energy as the remote-control signal.

As will be obvious from the foregoing description, with the remote control device according to the present invention, any noise pulse possibly mixed into the remote control signal is never demodulated or decoded and the correct code regeneration is achieved, since the transmitter converts the keyword information into a train of pulses having predetermined pulse widths and pulse-modulates these code-converted pulses to provide the remote control signal to regenerate the keyword information. In consequence, there is provided remote control device for the vehicle lock operation with high accuracy and being substantially free from influence of electric noise.

What is claimed is:

1. A remote control device for operating locks of a vehicle comprising, a receiver provided on the vehicle and a transmitter remote from the vehicle, said receiver being adapted to receive a remote control signal transmitted from said transmitter at a location remote from the vehicle and in response thereto control locking and unlocking of the vehicle locks, characterized in that:

said transmitter comprising, means for coding keyword information, means for converting said coded information into pulses, means for pulse-modulating said pulses, and means for transmitting the pulse-modulated pulses as a remote control signal;

said receiver comprising, means for receiving said remote control signal, means for demodulating the received signal, means for decoding the demodulated signal into an encoded information signal, means for comparing said encoded information signal with a preset code and means for generating an execution signal for operating said locks upon occurrence of a predetermined relationship between the encoded information signal and said preset code;

said means for coding keyword information including a plurality of coding elements for producing at least two output signals with each of said at least two output signals being one of a high level voltage, a low level voltage and a high impedance relating to the information to be coded, and a voltage signal generator for generating a varying voltage signal and for supplying said varying voltage signal through resistors common to respective outputs of said coding elements.

2. The remote control device of claim 1 wherein said means for converting the coded information into pulses and pulse-modulating said pulses provided in the transmitter includes means for converting the coded keyword information into pulses of predetermined pulse widths, and a carrier for pulse-modulating the converted pulses.

3. The remote control device of claim 1 wherein the transmitter comprises a driver for acting upon an input of the pulse-modulated pulses, and an infrared-ray emitting diode for producing an infrared-ray remote control signal driven by an output of said driver; and said remote control signal receiving means of the receiver comprises a filter through which said infrared-ray remote control signal is transmitted, and a photo-diode for receiving said infrared-ray signal from the filter and photoelectrically converting said received infrared signal.

* * * * *